US007008655B1

(12) United States Patent
Aslanis

(10) Patent No.: US 7,008,655 B1
(45) Date of Patent: Mar. 7, 2006

(54) PROCESS FOR MAKING A BAKED CUP SHAPED FOOD PRODUCT

(75) Inventor: Rosemary Stirling Aslanis, Christchurch (NZ)

(73) Assignee: Artos International Limited, Christchurch (NZ)

( * ) Notice: Subject to any disclaimer, the term of this patent is extended or adjusted under 35 U.S.C. 154(b) by 297 days.

(21) Appl. No.: 10/048,460

(22) PCT Filed: Aug. 4, 2000

(86) PCT No.: PCT/NZ00/00149

§ 371 (c)(1),
(2), (4) Date: Mar. 19, 2002

(87) PCT Pub. No.: WO01/10222

PCT Pub. Date: Feb. 15, 2001

(30) Foreign Application Priority Data

Aug. 6, 1999 (NZ) .................................. 337115

(51) Int. Cl.
*A21D 13/00* (2006.01)
(52) U.S. Cl. ..................... 426/94; 426/95; 426/100; 426/101; 426/138; 426/139; 426/279; 426/280
(58) Field of Classification Search .............. 426/94, 426/95, 100, 101, 138, 139, 237
See application file for complete search history.

(56) References Cited

U.S. PATENT DOCUMENTS 4,812,323 A * 3/1989 Savage ...................... 426/496

| 4,931,301 | A |   | 6/1990  | Giuseppe ................. 426/505 |
| 5,223,286 | A | * | 6/1993  | Selbak ..................... 426/94 |
| 5,304,386 | A | * | 4/1994  | Dugas et al. ............... 426/94 |
| 5,352,111 | A |   | 10/1994 | Selbak ..................... 425/351 |
| 5,376,320 | A |   | 12/1994 | Tiefenbacher et al. ........ 264/50 |
| 5,711,908 | A |   | 1/1998  | Tiefenbacher et al. ....... 264/232 |
| 5,928,273 | A | * | 7/1999  | Schmidt .................... 607/104 |
| 6,153,239 | A | * | 11/2000 | Thiele et al. ............... 426/138 |
| 6,180,151 | B1 | * | 1/2001 | Geng et al. ................. 426/448 |

FOREIGN PATENT DOCUMENTS

EP   0896796 A2   2/1999

OTHER PUBLICATIONS

Derwent Abstract Accession No. 75-48959W, SU 440 132 (DZHUGAS), Feb. 4, 1975.

* cited by examiner

*Primary Examiner*—Lien Tran

(74) *Attorney, Agent, or Firm*—Jacobson Holman PLLC

(57) ABSTRACT

A process for manufacturing a food product, a food product produced thereby and a plant for production of the food product. The food product may have a generally truncated cone shape which allows the product to be stood on its base. The baking mixture is inserted into mould cavities of a tray and fitting a second tray with male formers corresponding to the mould cavities into the first tray prior to baking. The trays may pass through the oven on an endless conveyor as part of a plant which includes a filling station, for filling the baked product with sweet or savoury fillings, and a freezing station. The food product is baked with a high liquid content to allow for the formation of a thin, tough impervious layer of gelatinised starch skin to form on the product surfaces.

12 Claims, 12 Drawing Sheets

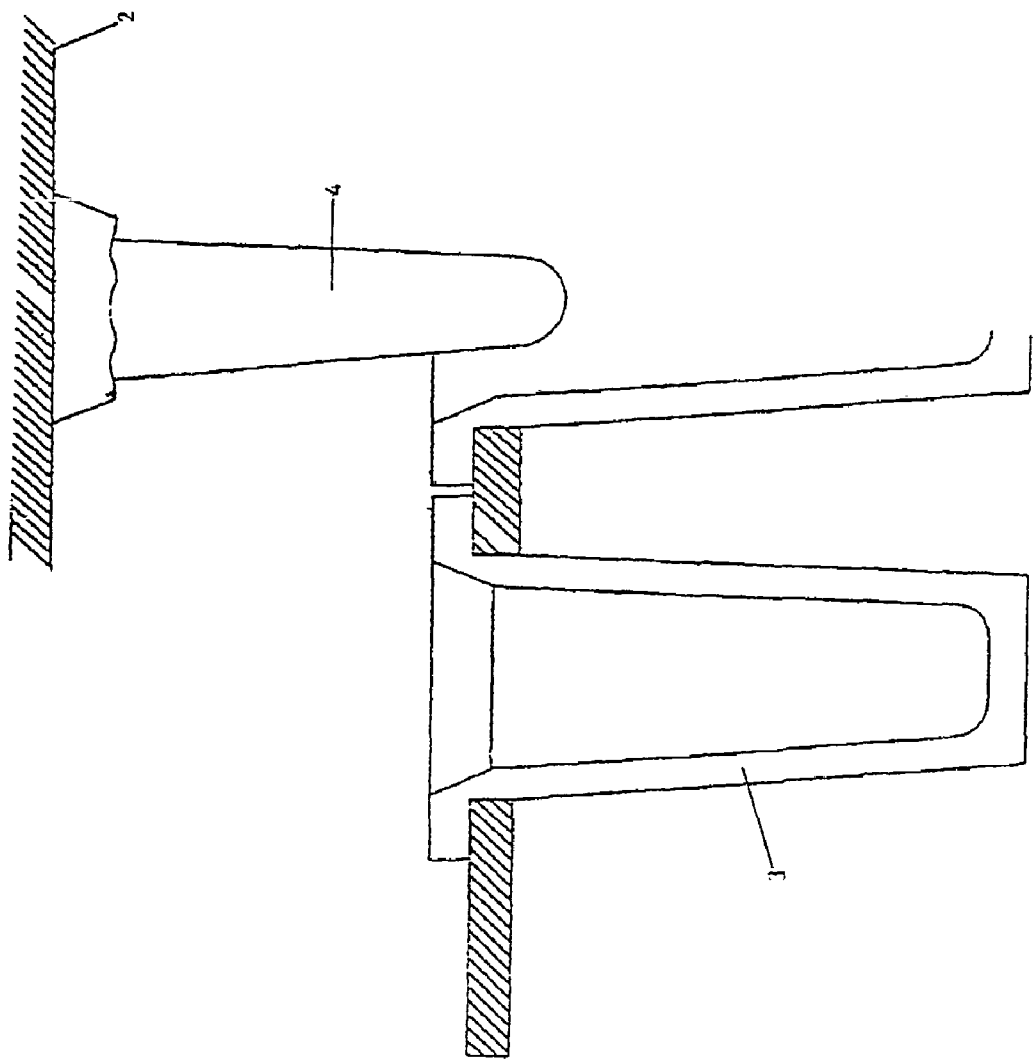

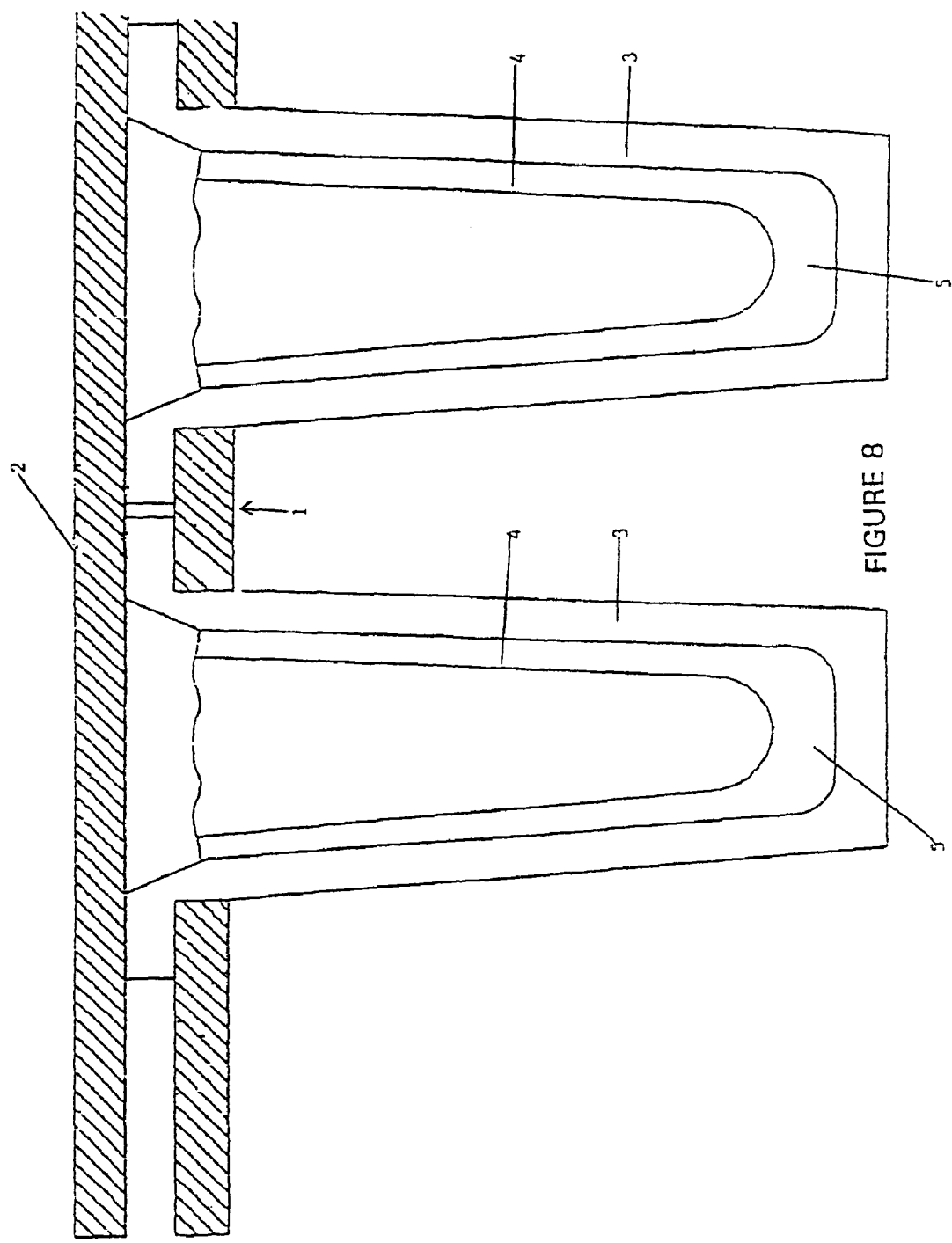

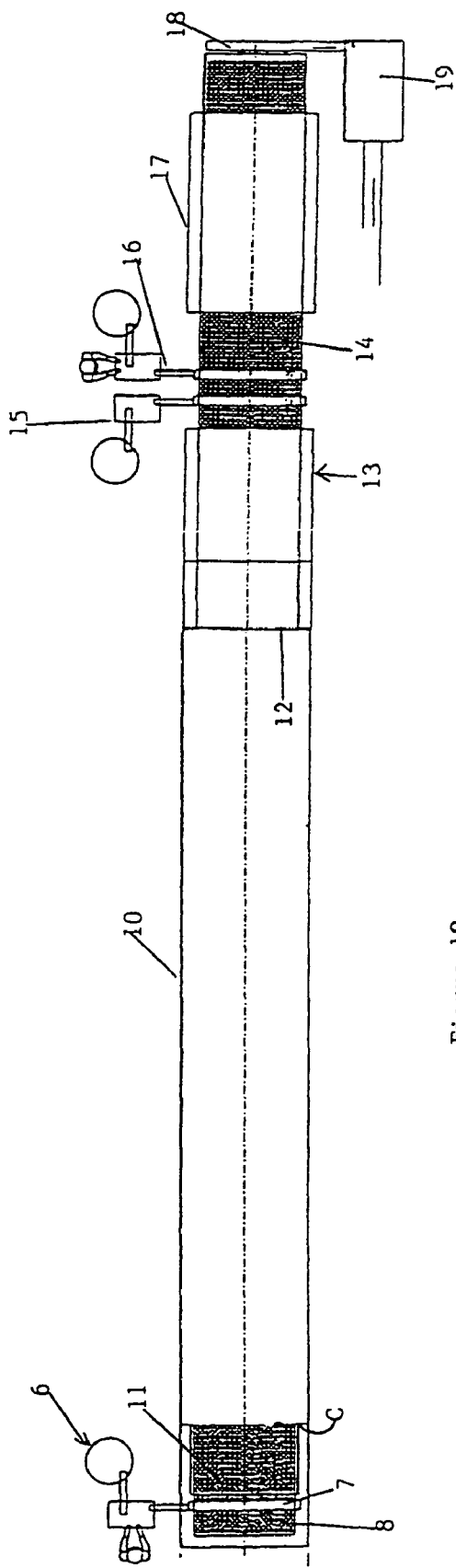
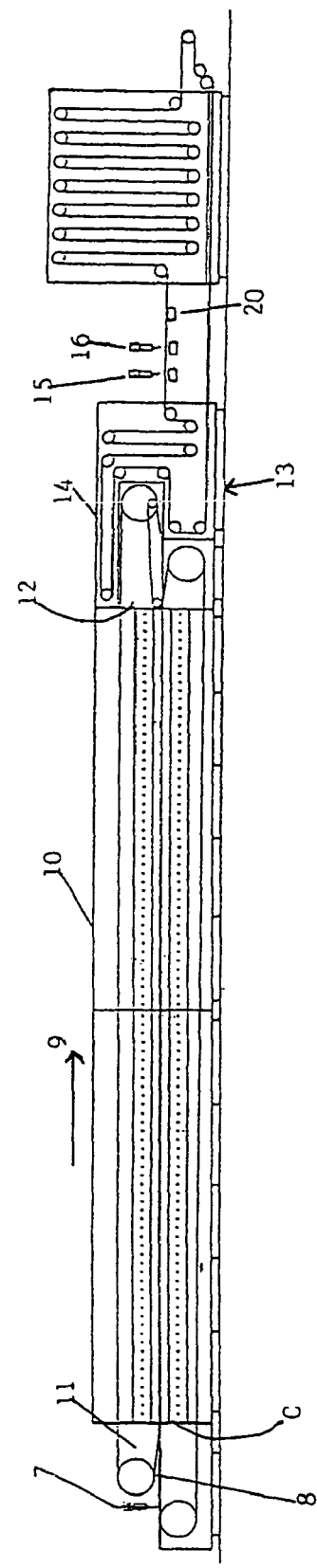
Figure 19
Figure 20

PROCESS FOR MAKING A BAKED CUP SHAPED FOOD PRODUCT

This is a nationalization of PCT/NZ00/00149 filed Aug. 4, 2000 and published in English.

FIELD OF THE INVENTION

The invention relates to a process for manufacturing a food product, a food product produced thereby and a plant for production of the food product. Particularly the invention relates to a food product, such as a generally truncated cone shaped product, pie base or the like which allows the product to be stood on its base.

BACKGROUND OF THE INVENTION

At present a large number of processes are described in patent and other literature for producing food products and because of the number there are too many to separately detail.

One such process is that described in U.S. Pat. No. 5,626,897. This process describes using a flat strip of dough which is wound to form a cone shaped product. A difficulty with this product is that it is not free standing and that a special coating is required to help seal the overlapping sections of the spirally wound dough to form a cavity in which a filling is placed.

SUMMARY OF THE INVENTION

An object of the invention is to provide a process and plant for manufacturing a food product which at least overcomes the disadvantages identified above and provides an end product which offers a consumer an alternative choice.

Further objects and advantages of the invention will become apparent from the following description which is given by way of example.

According to a first aspect of the invention there is provided a process for producing a food product, the process including the steps of:
mixing ingredients as herein described to form a consistent mix;
placing the mix into cavities of a tray;
fitting to the tray a lid incorporating male formers or members adapted to form with the cavities in the tray mould cavities of the same size and shape as the end products;
placing the filled and capped tray in an oven for a predetermined time at a preset temperature to thereby par-bake or fully bake the mix to seal and create an impervious surface to each end product;
removing the tray from the oven;
separating the tray and lid;
removing the end products from the mould cavities for use as a food product or for further processing.

The end products are cooled prior to filling.

The end product produced has a low fat content.

The mix can be placed into the cavities of the tray by a depositor situated above a conveyor on which a series of the trays are moved. The cavities of the tray(s) are filled successively.

The process can further include steps of pre-cooking appropriate savoury and/or sweet fillings which are inserted automatically into each cavity in the end product.

The filled end product can then be frozen in a blast freezer ready for packaging and storage in a freezer before transportation for use.

The cavities in the trays and the male members on the lids can be shaped to form a generally truncated cone shaped end product or a pie base shaped end product as well as other shapes all of which have a base which allows them to stand on a surface.

According to a second aspect of the invention there is provided a process for producing a food product, the process including the steps of;
mixing ingredients as herein described to form a consistent mix;
placing the mix into cavities of a tray;
placing into each cavity of the tray a pre-prepared filling;
fitting to the tray a lid incorporating farmers or members adapted to close the cavities and force the mix to enclose/cover the filling;
placing the filled and capped tray in an oven for a predetermined time at a preset temperature to thereby parbake or fully bake the mix to seal its outer surface to create an impervious skin to each food product;
removing the tray from the oven;
separating the tray and lid; and
removing the end product from the cavities in the mould for use in further processing.

The end product being baked with a high liquid content such as water gives an opportunity for a thin, tough impervious layer of gelatinized starch skin to form an the product surfaces.

The product being both yeasted and chemically leavened will create pressure against the mould, again early in baking, which helps the build up of the impervious shell layer.

Flour containing gluten is also necessary as the water is absorbed until saturation occurs which when combined with the gluten's forming properties and heat, provide strength therefore allowing the product to remain stable for easy removal after baking from the moulds. Without the gluten the product would collapse.

According to a third aspect of the invention there is provided a plant for producing a food product, the plant including:
a mixing station at which ingredients of a particular food product are mixed;
connecting means from the hopper to a depositor positioned over an endless conveyer incorporating a plurality of mould trays;
a second endless conveyor with mould lids positioned to locate immediately above the endless conveyor;
a baking chamber at an output end of which is a cooling region and transfer region and through which the endless conveyors pass;
at the cooling and transfer region the baked and products are removed from the moulds for transfer to either a blast freezer or to a topping station followed by the option of a topping station and then to a blast freezer after which the end products are moved to a packing or storage facility.

The transfer of the mix from the mixing station to the depositor may be via a pumping mechanism.

The end products may be removed from the moulds by suction at the transfer station.

The filling station may include an additional topping station.

According to a fourth aspect of the invention there is provided a food product produced from the process or plant as hereinbefore defined which after formation or production has liquid holding capacity.

BRIEF DESCRIPTION OF THE DRAWINGS

Particular examples of the invention will now be described with reference to the accompanying drawings in which:

FIG. 7 shows a detailed view of the tray and lid shown in FIGS. 5 and 6 coming or being moved together;

FIG. 8 shows the lid and tray shown in FIGS. 5 to 7 assembled together;

FIG. 19 shows a plan view of a second example of plant for use in the production of an end product according to the invention; and FIG. 20 shows a side view of the plant shown in FIG. 19.

DETAILED DESCRIPTION OF THE PREFERRED EMBODIMENTS

Figure 2:
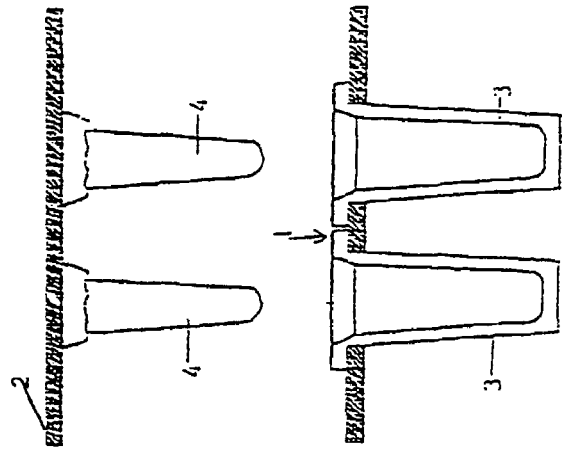
FIG. 2 shows a sectional side view of the tray and lid shown in FIG. 1.
Figure 4:
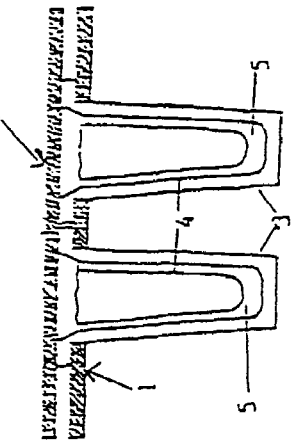
FIG. 4 shows a view similar to FIG. 2 with the lid on the tray.
Figure 1:
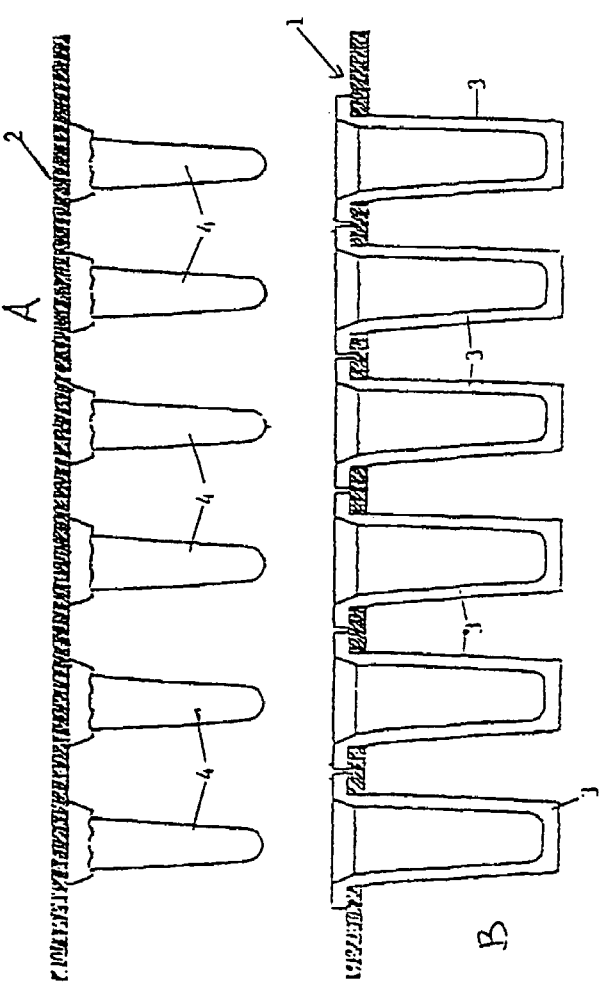
FIG. 1 shows a sectional front view of a tray and corresponding lid shown spaced apart.
Figure 3:
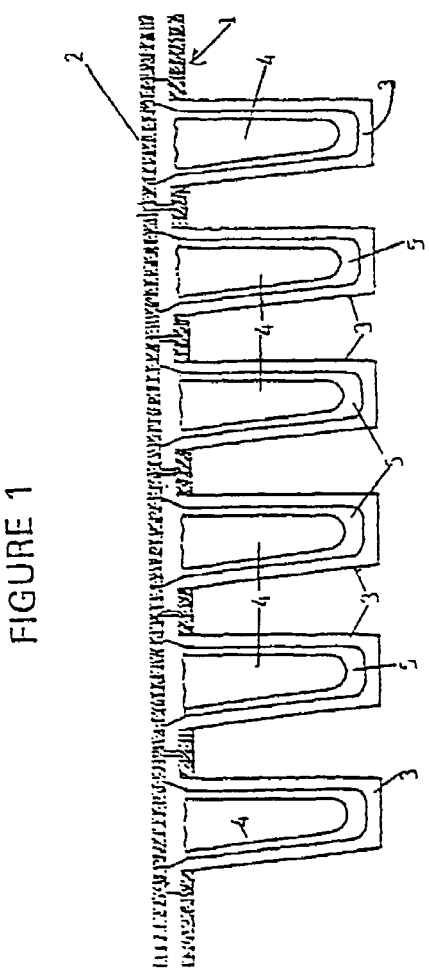
FIG. 3 shows a similar view to that in FIG. 1 with the lid situated on the tray.
Figure 5:
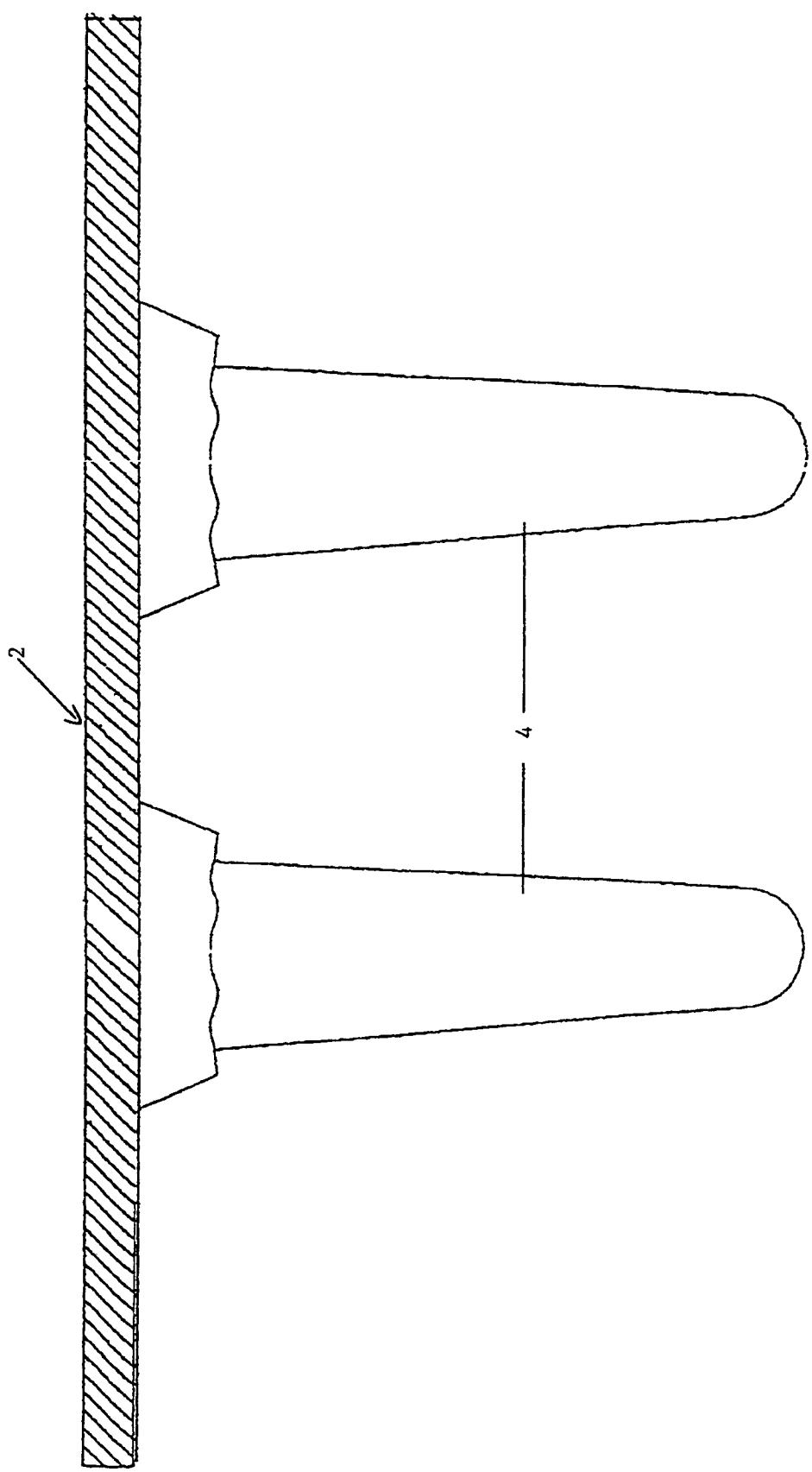
FIG. 5 shows on an enlarged scale a section of the lid at position A on FIG. 1.
Figure 6:
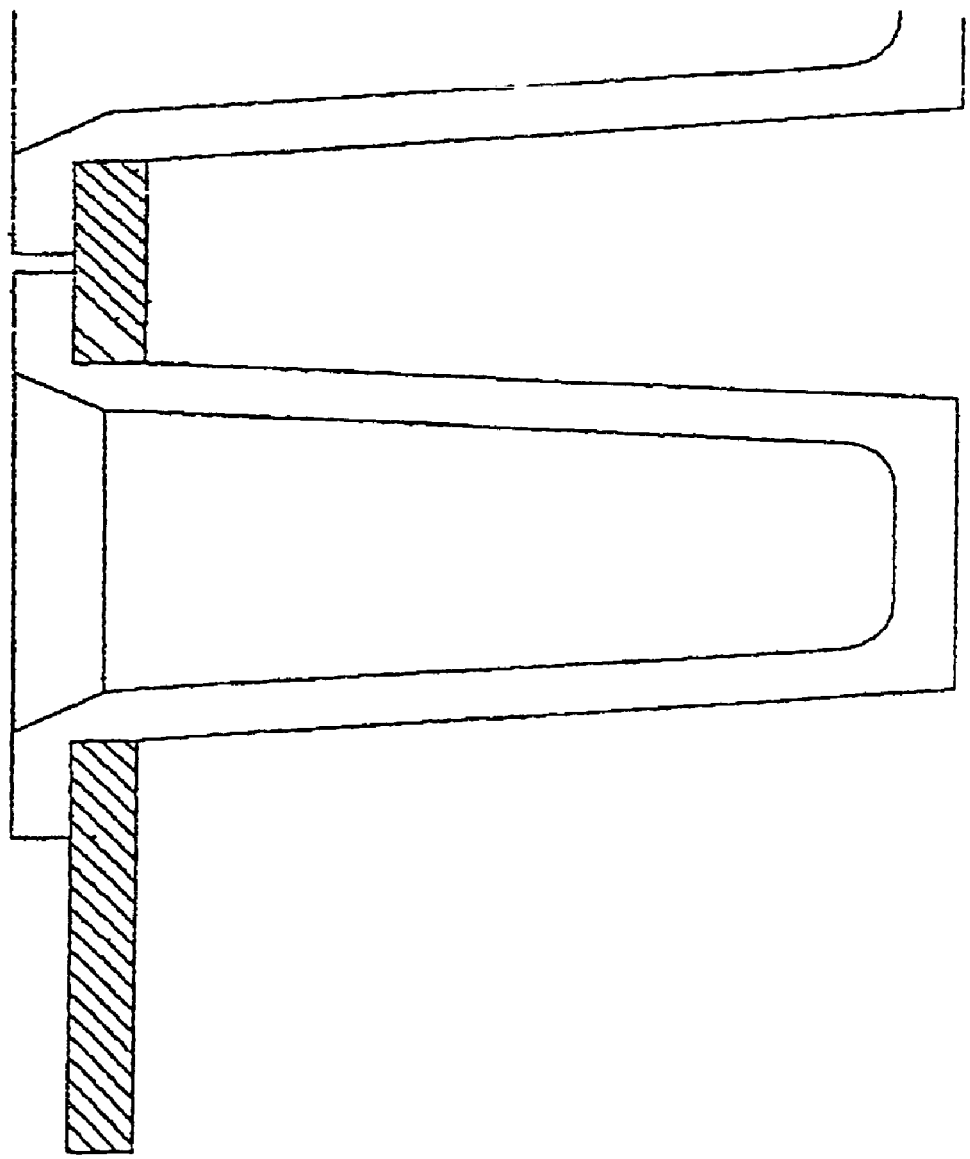
FIG. 6 shows in detail on an enlarged scale a section of the tray indicated at position B in FIG. 1.
Figure 10:
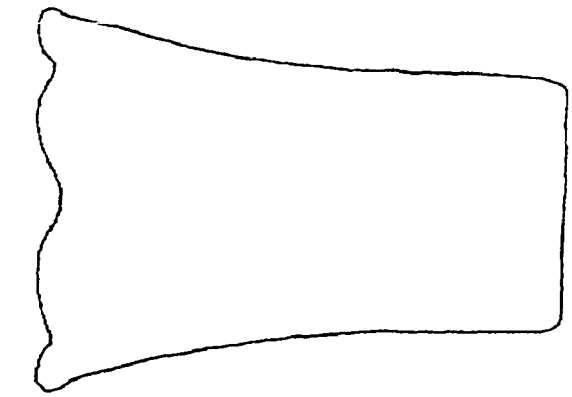
FIG. 10 shows a side view of the food product shown in FIG. 9.
Figure 12:
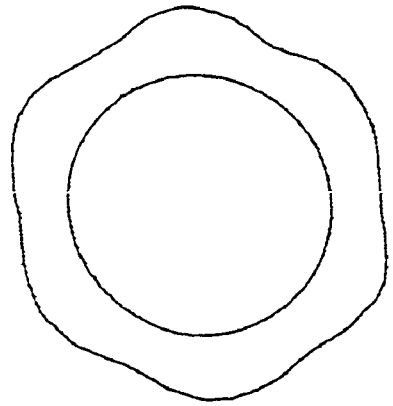
FIG. 12 shows a plan view of the food product shown in FIGS. 9 to 11.
Figure 11:
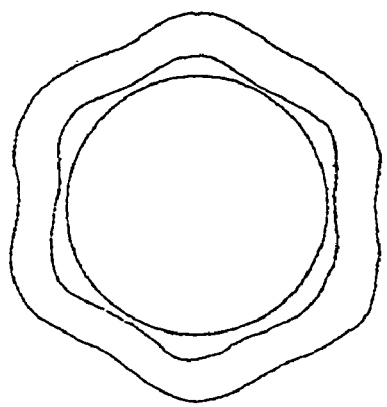
FIG. 11 shows a view from below of the truncated cone shaped food product shown in FIGS. 9 and 10.
Figure 9:
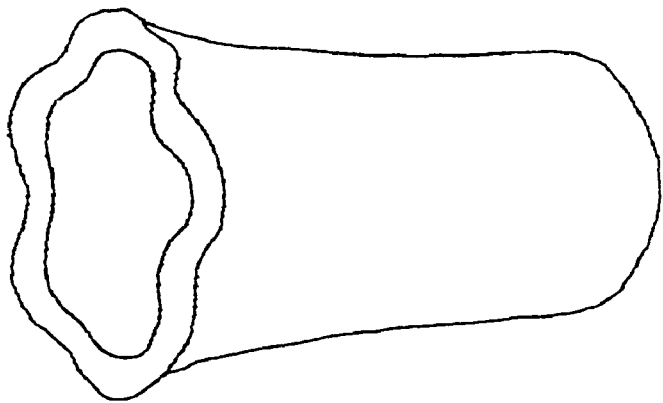
FIG. 9 shows a perspective view of a food product produced by the tray and lid combination shown in FIGS. 1 to 7.
Figure 13:
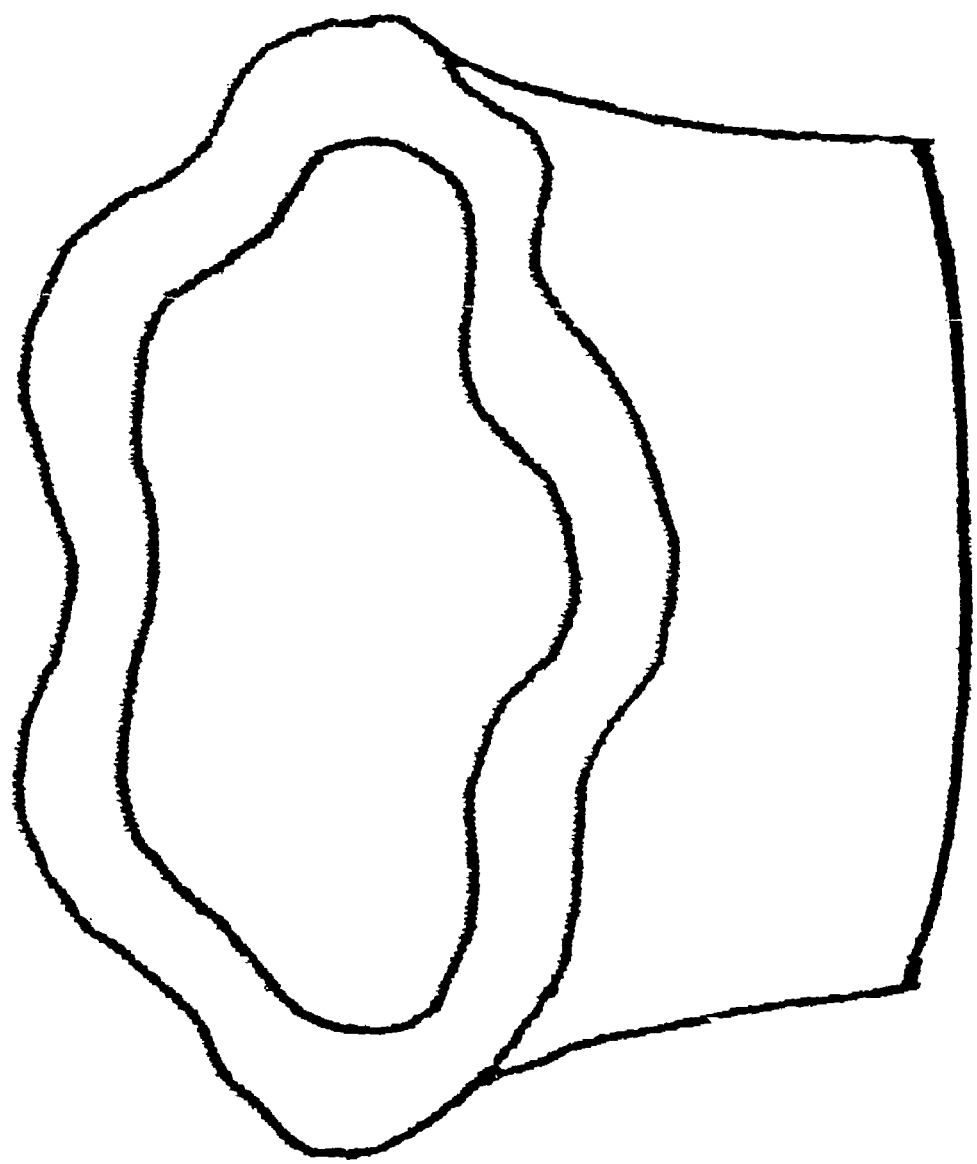
FIG. 13 shows a perspective view of a pie base food product.
Figure 14:
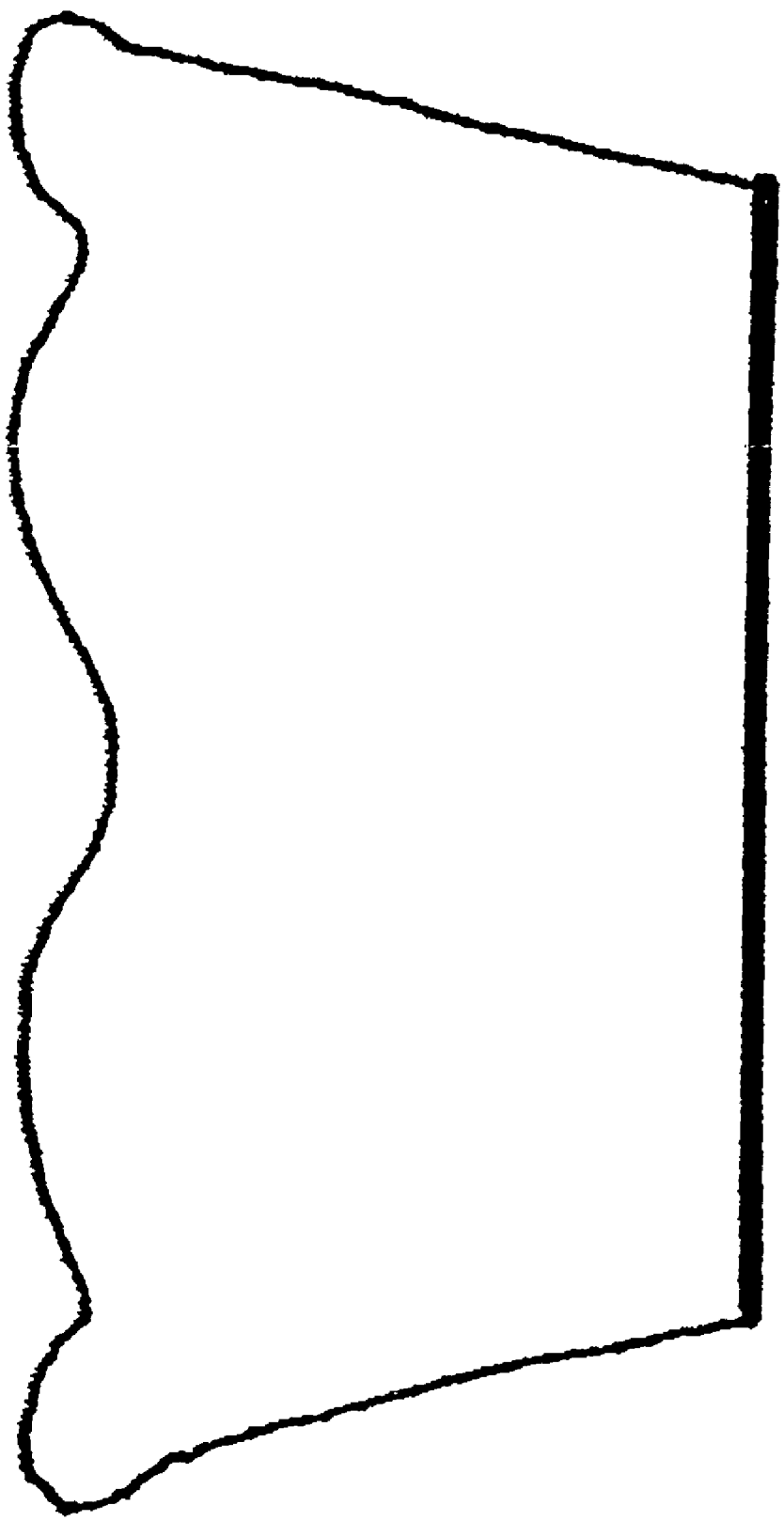
FIG. 14 shows a side view of the pie base shown in FIG. 13.
Figure 15:
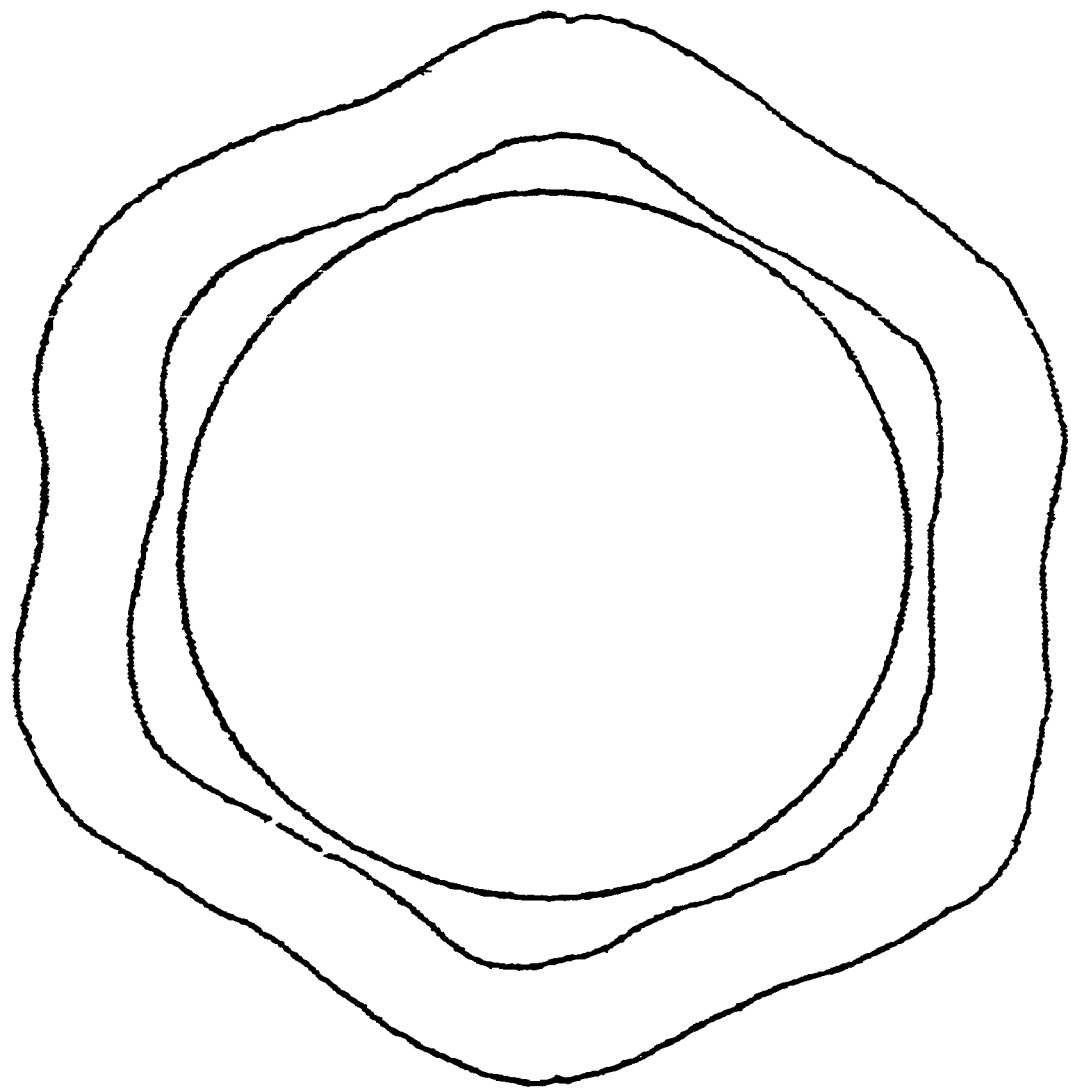
FIG. 15 shows a plan view of the pie food product shown in FIGS. 13 and 14.
Figure 16:
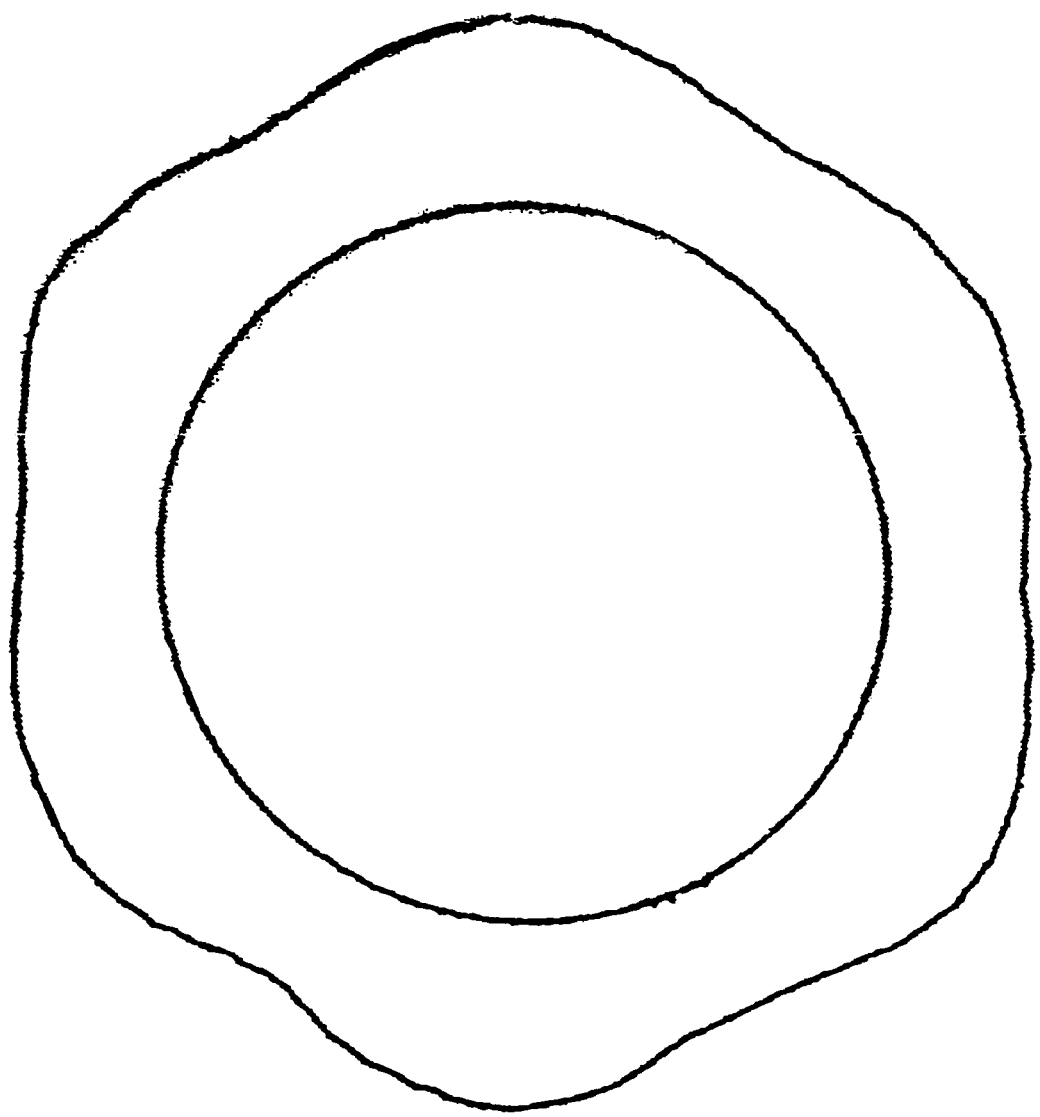
FIG. 16 shows a bottom view of the pie base food product shown in FIGS. 13 to 15.

The ingredients for a mix for producing the generally truncated cone shaped product are selected to suit and the total weight of flour must be the same as that of the liquid at about 30° C. and if water is included in the recipe then the approximate water temperature should be 27°–30° C.

The process steps should follow the directions listed below or the cones will not release from the trays.

(a) Mixing the Ingredients.

Add instant yeast to bowl just before mixing.
1. Mix dry ingredients in bowl for 1 minute on speed 1 or low.
2. Always use a paddle to mix ingredients.
3. Water at appropriate temperature. Add oil to water.
4. Pour combined water and oil to bowl.
5. Mix for 3 minutes on speed 1 or low.
6. Stop and check to make sure there is no residue flour at bottom of bowl. If there is, use a scraper to mix in.
7. Mix for 1 minute on speed high.
8. Mix must be used within 60 minutes and no resting time is required.

(b) Filling Trays
9. Pour or pump mix into holding tank then to depositor.
10. Deposit mix into base of tray.
11. Place lid on base and place in oven.

(c) Bake for Designated Time.

(d) Product Removal
12. Cones to be cooled completely to ambient temperature.

(e) Optional Filling
13. Fill cone automatically with appropriate savoury or sweet fillings.
14. Transfer to a blast freezer.

The above process steps can be automated.

DEPOSITOR

Control

With control there is no excess mix in moulds and therefore no dried mix debris in the moulds because of the characteristics of the mix which seals its outer surface leaving no debris in the moulds. The mix as it rises in the mould forms an uneven upper surface to the product. This can give a scalloped appearance to the upper edge.

MIX

The ingredient list depends on the eventual product required as does mixing and baking procedures.

Do not change mixing times, speeds or replace paddle.

BAKING PROCEDURE

The combination of ingredients, and mixing method has eliminated the need for proving.

Mix to be used within an hour. Do not use any which has been resting for longer as pulling and stretching begins and ultimately the cone may tear when baked. A small split can occur which is hardly noticeable and then when the cone is filled, problems will arise due to the extra weight contained within the cone.

Mix is pumped into holding tanks for depositing into trays.

Mix cannot be stored and remixed or added to other mix. Mixing must be accurate to alleviate the potential problem of waste. Flour ingredient proportion to water is critical.

Each mould is nearly filled before the lids are placed on their upper surface. This enables quality control.

The removed cones are ideally placed on an open mesh conveyor to create quick cooling of the cones.

The quicker the cone cools the better the product.

Do not fill cones until totally cool or place empty cones in freezer until cool. The cone becomes stable when cool.

Do not leave unprotected filled or empty cones in freezer for more than 8 hours maximum or dehydration and contamination of the cone may occur. There is a long term effect which is splitting which can occur. The cone can be packed either stood vertically when frozen or laid side by side so as to prevent the circular shape becoming oval. They can be stacked inside each other like an ice-cream cone.

Filling

Fill the cone to the level of the lowest scallop edge and do not fill the cone until it has been cooled.

Appearanc

Smooth shiny cavity wall and smooth even exterior wall.

Taste

Savoury cone is moorish and nutty, and there is no after taste which indicates high fat, salt or sugar.

Dessert or sweet cone.

Feeling

Firm so it does not fall out of cone when inverted.

Cone and Filling Specifications

The following Table shows the ingredient list for a number of example products according to the invention.

|  | STANDARD | WHOLEMEAL | SWEET | FRUIT |
|---|---|---|---|---|
| Maximus flour | x | x | x | x |
| Harvest wholemeal | — | — | — | — |
| Baking powder | x | x | x | x |
| Soya flour | x | x | — | — |
| Dried yeast | x | x | x | x |
| Cereform deluxe royal | x | x | x | x |
| Milk powder | x | x | x | x |
| Vegetable oil | x | x | x | x |
| Salt | x | x | x | x |
| Sugar | — | — | x | x |
| Mixed spice | — | — | — | x |
| Soy & linseed | — | — | — | — |
| Parmesan cheese | — | — | — | — |
| Tomato puree | — | — | — | — |
| Fruit | — | — | — | x |
| Water +/− | x | x | x | x |

Mould Trays

In FIGS. 1 to 8 is shown an example of tray mould 1 and associated lid 2 which are designed to create a plurality of truncated cone shaped food products.

The tray mould 1 incorporates a plurality of shaped cavities 3 into which male members 4 of the lid 2 fit. The space 5 between the outside of each male member 4 and its associated cavity 3 forms the mould for the product.

FIGS. 9 to 16 show the shape of examples of end product which can be produced.

Plant

Figure 17:
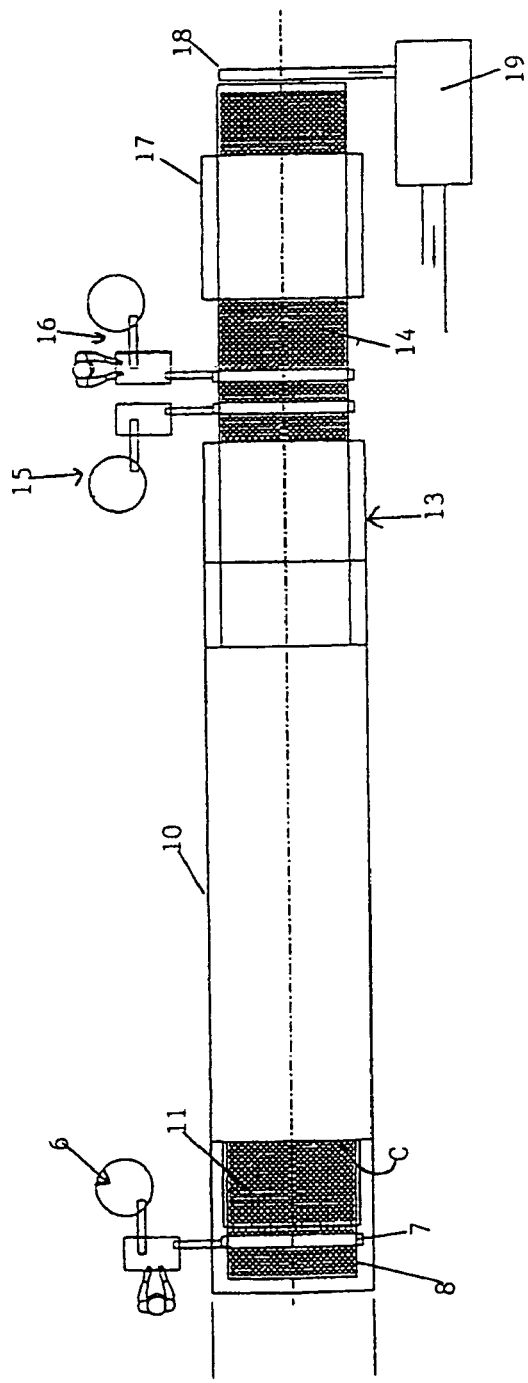
FIG. 17 shows a plan view of a plant for use in production of an end product according to the invention.
Figure 18:
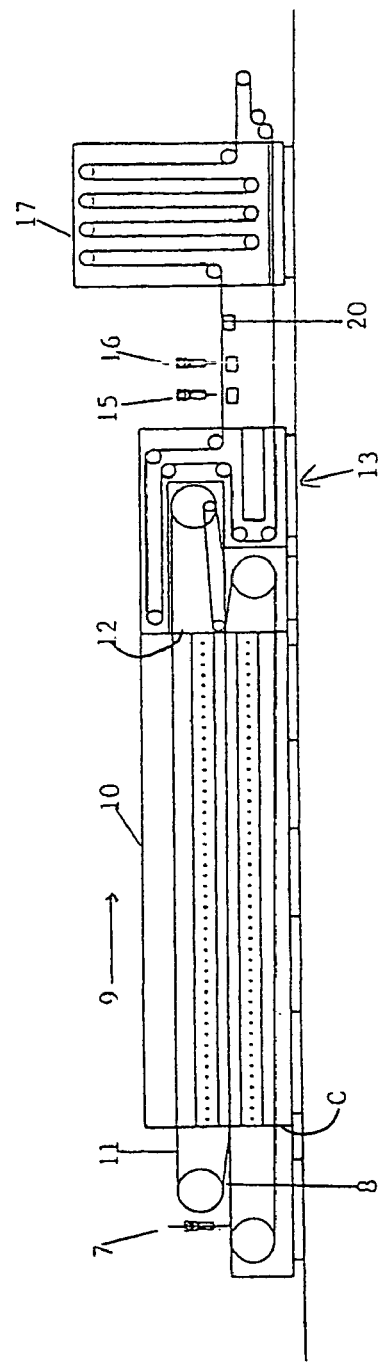
FIG. 18 shows a side view of the plant shown in FIG. 17.

In FIGS. 17 and 18 is shown a plant for producing the food products. The plant in this example is a modified tunnel oven designed to create a continuous throughput of about 5,000 units per hour.

The plant includes a mixing station generally indicated by arrow 6. The mixing station 6 is linked to a depositor 7. The flow of mixed ingredients from the mixing station 6 to the depositor 7 may be by way of a pump (not shown).

The depositor 7 is situated above an inlet end C of the oven above an endless conveyer 8 on which a plurality of mould trays are mounted. The mould trays move in the direction of the arrow 9 shown. The mould trays consist of a plurality of cavities the shape of which is similar to the shape of the cavities shown in FIGS. 1 and 2.

The endless conveyer 8 passes through a baking chamber generally indicated by arrow 10.

Also passing through the baking chamber 10 is a second endless conveyer 11 carrying mould lids which at the inlet end C rest on top of the mould trays while they pass through the baking chamber 10 to an outlet end generally indicated by 12.

At the outlet end 12 of the baking chamber there is situated a cooling chamber and transfer region 13.

In the cooling chamber and transfer region 13 the end products are cooled as quickly as possible.

The end products are removed from the cavities by any suitable means such as a suction mechanism which assists in transfer of the end products from the cavities to an output endless conveyer 14 which moves the end products through the cooling chamber. The rate of movement of the conveyer 14 can be adjusted to increase or decrease the dwell time of the end products. Increasing cooling before the cooled product is either passed to a filling and/or topping station or direct to a blast freezer if preferred.

At a filling station 15 the cones may be filled with appropriate ingredients and these may be pre-prepared. The ingredients may be topped at a topping station 16 if a topping is appropriate. The end products then pass to a blast freezer 17.

After removal of the end products from the blast freezer 17 they may be transferred automatically by a transverse conveyer system 18 to a packing machine 19 from which cartoned products are transferred for shipment or storage.

In the second example of plant shown in FIGS. 19 and 20 the plant incorporates similar parts to the unit shown in FIGS. 17 and 18 although its capacity is increased to 10,000 units per hour.

In this instance the dwell time in the cooling chamber 13 and blast freezer 17 are increased by increasing the length of the output conveyer 14.

In both examples of plant is shown a logo applicator 20. The logo applicator 20 can be used to apply to the end product a food quality dye in the shape of an appropriate emblem motif or logo to suit particular customer's requirements.

The plants as shown can be substantially automated.

Thus by this invention there is provided a process and plant for producing a food product and a food product produced thereby. The food product may be par baked and filled and is re-heated in an oven before use or if fully baked is re-heated in a microwave.

Particular examples of the invention have been described and it is envisaged that improvements and modifications can take place without departing from the scope of the attached claims.

What is claimed is:

1. A process for producing a food product with an impervious exterior surface and low fat content, the process comprising the steps of:

mixing dry ingredients for a particular food product in a mixing station with a paddle for one minute, the mixing ingredients including flour;

mixing the flour with a high liquid content for three minutes with a total weight of the flour being equal to a total weight of the liquid content;

depositing the mixed ingredients within one hour of mixing into cavities in a plurality of mould trays mounted on a first endless conveyor;

positioning mould lids on a second endless conveyor so that the mould lids locate and close the filled mould trays mounted on the first endless conveyor;

feeding the filled and closed mould cavities through a baking chamber at an output end of which is a cooling region and transfer region through which the first and second endless conveyors pass;

baking the food product with the high liquid content to form a thin, tough impervious layer of gelatinized starch skin on surfaces of the end product by yeasting and chemically leavening the food product to build up the impervious layer;

at the cooling and transfer region the baked end products are removed from the moulds for transfer to either a blast freezer or to a filling station and/or topping station and then to a blast freezer after which the end products are moved to a packing or storage facility to produce a product with the impervious exterior layer.

2. The process as claimed in claim 1, wherein the transfer of the mix from the mixing station to the depositor is via a pumping mechanism.

3. The process as claimed in claim 1, wherein the end products are removed from the moulds by suction at the transfer station.

4. The process as claimed in claim 1, wherein the filling station includes a topping station.

5. The process for producing a food product as claimed in claim 1, wherein the mould cavities are in a series of trays and the mould lids incorporate male formers or members adapted to form with the mould cavities moulds of the same size and shape as the desired end products.

6. The process as claimed in claim 1, wherein the filled and closed mould cavities are in the baking chamber for a predetermined time at a preset temperature to thereby par-bake or fully bake the mix to seal and create the impervious surface to each end product.

7. The process as claimed in claim 6, including the additional step of:
   placing into each filled cavity of the mould trays a pre-prepared filling.

8. The process as claimed in claim 6, wherein the end products are cooled prior to filling.

9. The process as claimed in claim 1, including the further step of pre-cooking appropriate savoury and/or sweet fillings which are inserted automatically into each cavity in the end product which is then frozen in a blast freezer ready for packaging and storage in a freezer before transportation or use.

10. The process as claimed in claim 1, wherein the cavities in the trays are shaped to form a generally truncated cone shaped end product or a pie base shaped end product as well as other shapes all of which have a base which allows them to stand on a surface.

11. The process as claimed in claim 1, wherein a temperature of the high liquid content mixed with the flour is in the range of 27–30° C.

12. The process as claimed in claim 11, wherein a temperature of the high liquid content mixed with the flour is about 30° C.

* * * * *